UNITED STATES PATENT OFFICE 2,654,782

PROCESS FOR THE MANUFACTURE OF OCTAALKYLPYROPHOSPHORAMIDES

Henry Tolkmith, Midland, Mich., assignor to The Dow Chemical Company, Midland, Mich., a corporation of Delaware No Drawing. Application August 17, 1951,
Serial No. 242,403

9 Claims. (Cl. 260—545)

The present invention is concerned with a novel process for the manufacture of pyrophosphoramides of the formula

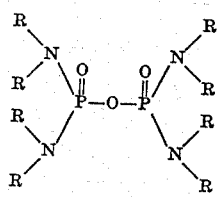

In the above and succeeding formulae R represents an alkyl radical containing from 1 to 4 carbon atoms, inclusive.

The new process comprises subjecting a tris-(tetraalkyldiamidophosphoryl) phosphate of the formula

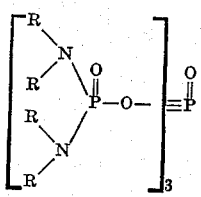

to a temperature greater than 135° C. while admixed with a hexaalkylphosphoramide of the formula

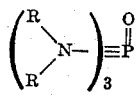

The exact mechanics of the reaction are not completely understood. Some octaalkylpyrophosphoramide is produced under the described reaction conditions regardless of the proportions of hexaalkylphosphoramide and tris(tetraalkyldiamidophosphoryl) phosphate present in the reaction mixture. In preferred practice, increased yields of the desired compound are obtained when at least 1 molecular proportion of the hexaalkylphosphoramide is employed with each molecular proportion of the tetraphosphate. Best results are obtained when an excess of up to 6 molecular proportions of the hexaalkylphosphoramide is reacted with each molecular proportion of the tris(tetraalkyldiamidophosphoryl) phosphate.

The production of the octaalkylpyrophosphoramides has been found to take place at a temperature greater than 135° C. Since the desired products have a tendency to decompose at temperatures in excess of 190° C., exposure to such elevated temperatures for any appreciable period of time should be avoided.

The rate at which the formation of the pyrophosphoramides takes place has been found to vary directly with the temperature employed. In the practice of the invention, the heating is generally carried out over a period of from 2 to 12 hours or longer, the longer periods of reaction being employed at the lower temperatures.

In carrying out the process of the present invention, the total reactant charge may be mechanically mixed and then heated for a period of time. Alternatively, the tris(tetra-alkyldiamidophosphoryl) phosphate may be added portionwise to the hexaalkylphosphoramide under conditions of elevated temperature in the reaction vessel. Upon completion of the reaction, low boiling constituents may be stripped from the reaction mixture by distillation under reduced pressure and preferably under 190° C.

The crude reaction products as obtained in the practice of the present method may be employed in parasiticidal compositions without purification or separation. If desired, however, the octaalkylpyrophosphoramide may be separated from the reaction product by molecular distillation.

The tris(tetraalkyldiamidophosphoryl) phosphates employed as starting materials in the aforedescribed process may be produced by the method disclosed in my copending application Serial No. 242,401 filed concurrently herewith. This method comprises reacting at a temperature of from 90° to 135° C. at least three molecular proportions of a compound of the formula

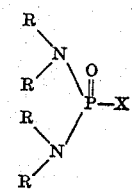

with one molecular proportion of a compound of the formula

in which formulae X is a member of the group consisting of chlorine and R'—O— and Y is the other member of said group, and R' and R each represent an alkyl radical containing from 1 to 4 carbon atoms, inclusive. The reaction involves a condensation resulting in the formation of alkyl chloride. In practice, substantially all the chlorine in the tetraalkyldiamidophosphoric chloride or phosphorus oxychloride may be recovered as alkyl chloride (R'Cl).

In carrying out the reaction, the tetraalkyldiamidophosphoric chloride and tri (lower alkyl) phosphate or the O-alkyl tetraalkyldiamidophosphate and phosphorus oxychloride are mixed together and the resulting dispersion heated with stirring at a temperature of from 90° to 135° C. until no further substantial amounts of alkyl chloride of reaction are evolved. The expression, "lower alkyl," as herein employed, refers to methyl, ethyl, propyl or butyl. Upon completion of the reaction, the mixture may be distilled under reduced pressure and under 135° C. to separate low boiling constituents and to obtain as a residue the desired tris(tetraalkyldiamidophosphoryl) phosphate product.

In carrying out the method of the present invention it has been found unnecessary to isolate the tris(tetraalkyldiamidophosphoryl) phosphates to be employed as starting materials. Thus, the new process may be carried out by subjecting the precursors of the tris(tetraalkyldiamidophosphoryl) phosphates to a temperature greater than 135° C. while admixed with a suitable hexaalkylphosphoramide.

According to the latter procedure, a suitable tetraalkyldiamidophosphoric chloride and tri-(lower alkyl) phosphate are heated at a temperature greater than 135° C. while admixed with a suitable hexaalkylphosphoramide. Alternatively, the process may be carried out by subjecting phosphorus oxychloride and a suitable O-alkyl tetraalkyldiamidophosphate to a temperature greater than 135° C. while admixed with the appropriate hexaalkylphosphoramide. By product alkyl chloride of reaction is formed when the precursors of the tris(tetraalkyldiamidophosphoryl) phosphate are employed in the reaction mixture. In practice, substantially all of the chlorine in the tetraalkyldiamidophosphoric chloride or the phosphorus oxychloride may be recovered as alkyl chloride.

In the practice of this further modification of the invention, at least 1 and up to 6 or more molecular proportions of the hexaalkylphosphoramide is employed with an amount of the precursors of the tris(tetraalkyldiamidophosphoryl) phosphate sufficient to produce 1 molecular proportion of the latter phosphate compound. For example, at least 1 mole of the hexaalkylphosphoramide is employed with each 3 or more moles of the O-alkyl tetraalkyldiamidophosphate and 1 mole of phosphorus oxychloride, or with each 3 or more moles of the tetraalkyldiamidophosphoric chloride and 1 mole of the trialkylphosphate. As has been previously described, increased yields are obtained when a considerable excess of the hexaalkylphosphoramide is employed.

When the precursors of the tris(tetraalkylamidophosphoryl) phosphates are employed in the reaction mixture, the formation of the octaalkylpyrophosphoramides has been found to take place at a rate which varies directly with the employed temperature. The heating is generally carried out over a period of from 2 to 12 hours, or longer, the longer reaction time being employed at the lower temperatures. If desired, the mixture may be heated under reduced pressure to facilitate the removal of alkyl chloride from the reaction zone. Following the reaction, the desired product may be separated in the previously described manner.

The following examples illustrate the invention but are not to be construed as limiting the same:

Example 1

10 grams (0.02 mole) of tris(tetramethyldiamidophosphoryl) phosphate (having a density of 1.2474 and a refractive index $n/D$ of 1.4685 at 20° C.) and 10.75 grams (0.06 mole) of hexamethylphosphoramide were mixed together and the resulting dispersion heated with agitation for 5 hours at a temperature of 150° C. Following the heating period, the mixture was distilled under reduced pressure at gradually increasing temperatures up to a temperature of 170° C. to separate low boiling constituents and to obtain as a residue an octamethylpyrophosphoramide product. When the latter product is fractionated in a molecular still, there is obtained a substantial amount of octamethylpyrophosphoramide boiling at 139° to 140° C. at 1.5 millimeters pressure and having a refractive index $n/D$ of 1.4620 at 25° C.

Example 2

67.5 grams (0.396 mole) of tetramethyldiamidophosphoric chloride (having a density of 1.1823 and a refractive index $n/D$ of 1.4670 at 20° C.) 23.9 grams (0.131 mole) of triethylphosphate and 23.6 grams (0.131 mole) of hexamethylphosphoramide were mixed together and the resulting dispersion heated at a temperature of 155° C. until the evolution of ethyl chloride of reaction was substantially complete. The heating was carried out with stirring and over a period of about 4.5 hours. During the heating, ethyl chloride was separated and recovered from the reaction zone as formed. The reaction mixture was then subjected to molecular distillation and was found to contain 20 per cent by weight of octamethylpyrophosphoramide.

Example 3

0.322 mole of tetramethyldiamidophosphoric chloride, 0.107 mole of triethylphosphate and 0.215 mole of hexamethylphosphoramide were mixed together and the resulting dispersion heated as described in Example 2. During the heating gaseous ethyl chloride was separated and recovered from the reaction zone as formed. The reaction mixture was then distilled under reduced pressure to separate excess hexamethylphosphoramide and to obtain as a residue a product which upon molecular distillation was found to contain 60 per cent by weight of octamethylpyrophosphoramide.

Example 4

0.142 mole of tetramethyldiamidephosphoric chloride, 0.048 mole of triethylphosphate and 0.145 mole of hexamethylphosphoramide were mixed together and the resulting dispersion heated with agitation at a temperature of from 150° to 155° C. until no further substantial amounts of ethyl chloride of reaction were evolved. During the heating, which was carried out over a period of about 5 hours, ethyl chloride was separated and recovered from the reaction zone as formed. The reaction mixture was then distilled under reduced pressure at temperatures gradually increasing up to a temperature of 180° C. to separate excess hexamethylphosphoramide. The residue was then subjected to molecular distillation and found to contain 73 per cent of octamethylpyrophosphoramide.

Example 5

10.8 gram (0.06 mole) of O-ethyl tetramethyldiamidophosphate (having a density of 1.0230 and a refractive index n/D of 1.4409 at 20° C.) 3 grams (0.02 mole) of phosphorus oxychloride and 10.75 grams (1.06 mole) of hexamethylphosphoramide were mixed together and the resulting dispersion heated at a temperature of 150° C. until the evolution of ethyl chloride of reaction was substantially complete. The heating was carried out with stirring and over a period of about 5 hours. During the heating, ethyl chloride was separated and recovered from the reaction zone, as formed. Upon completion of the reaction, the mixture was distilled under reduced pressure at gradually increasing temperatures up to a temperature of 170° C. to separate low boiling constituents and to obtain an octamethylpyrophosphoramide product as a residue. Upon fractionation in a molecular still, the latter product yields a substantial amount of octamethylpyrophosphoramide.

In a similar manner other octaalkylpyrophosphoramides may be prepared as follows:

Octabutylpyrophosphoramide by heating a mixture of tris(tetrabutyldiamidophosphoryl) phosphate and hexabutylphosphoramide.

Octaethylpyrophosphoramide by heating a mixture of tetraethyldiamidophosphoric chloride, tributylphosphate and hexaethylphosphoramide.

Octapropylpyrophosphoramide by heating a mixture of O-butyl tetrapropyldiamidophosphate, phosphorus oxychloride and hexapropylphosphoramide.

Octaisopropylpyrophosphoramide by heating a mixture of tetraisopropyldiamidophosphoric chloride, trimethylphosphate and hexaisopropylphosphoramide.

Octasecondarybutylpyrophosphoramide by heating a mixture of O-methyl tetrasecondarybutyldiamidophosphate, phosphorus oxychloride and hexasecondarybutylphosphoramide.

Octaethylpyrophosphoramide by heating a mixture of tris(tetraethyldiamidophosphoryl) phosphate and hexaethylphosphoramide.

The octaalkylpyrophosphoramides as prepared in accordance with the present invention are oily liquids somewhat soluble in many organic solvents and water. They are of value as intermediates for the preparation of other phosphate derivatives and as toxic constituents of parasiticide compositions. Their use for combatting insect pests is disclosed in U. S. Patent No. 2,502,966.

I claim:

1. A process for the manufacture of a pyrophosphoramide of the formula

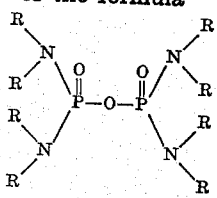

which comprises subjecting a tris(tetraalkyldiamidophosphoryl) phosphate of the formula

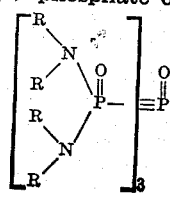

to a temperature of from 135° to 190° C. while admixed with a hexaalkylphosphoramide of the formula

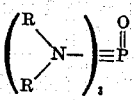

the symbol R in the above formulae representing an alkyl radical containing from 1 to 4 carbon atoms, inclusive.

2. A process for the manufacture of a pyrophosphoramide of the formula

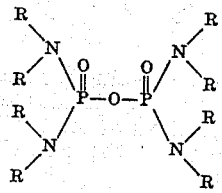

which comprises subjecting one molecular proportion of a tris(tetraalkyldiamidophosphoryl) phosphate of the formula

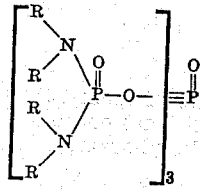

to a temperature of from 135° to 190° C. while admixed with at least one molecular proportion of a hexaalkylphosphoramide of the formula

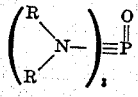

the symbol R in the above formulae representing an alkyl radical containing from 1 to 4 carbon atoms, inclusive.

3. A process for the manufacture of a pyrophosphoramide of the formula

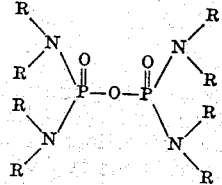

which comprises subjecting at least three molecular proportions of a compound of the formula

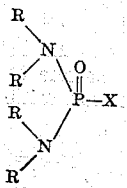

and one molecular proportion of a compound of the formula

to a temperature of from 135° to 190° C. while admixed with at least one molecular proportion of a hexaalkylphosphoramide of the formula

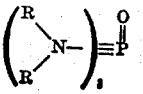

in which formulae X is a member of the group consisting of chlorine and R'—O— and Y is the other member of said group and R and R' each represents an alkyl radical containing from 1 to 4 carbon atoms, inclusive.

4. A process for the manufacture of a pyrophosphoramide of the formula

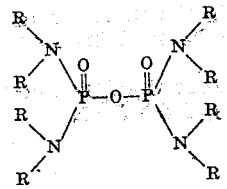

which comprises subjecting one molecular proportion of phosphorus oxychloride and at least three molecular proportions of an O-alkyl tetraalkyldiamidophosphate of the formula

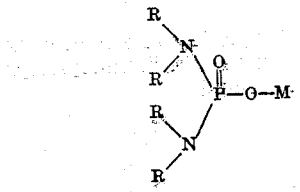

to a temperature of from 135° to 190° C. while admixed with at least one molecular proportion of a hexaalkylphosphoramide of the formula

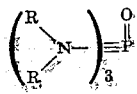

the symbols R and M in the above formulae each representing an alkyl radical containing from 1 to 4 carbon atoms, inclusive.

5. A process for the manufacture of a pyrophosphoramide of the formula

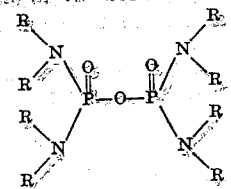

which comprises subjecting one molecular proportion of a tri(lower alkyl) phosphate and at least three molecular proportions of a tetraalkyldiamidophosphoric chloride of the formula

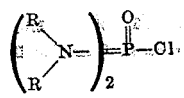

to a temperature of from 135° to 190° C. while admixed with at least one molecular proportion of a hexaalkylphosphoramide of the formula

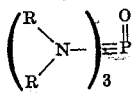

the symbols R in the above formulae representing an alkyl radical containing from 1 to 4 carbon atoms, inclusive.

6. A process for the manufacture of octamethylpyrophosphoramide which comprises subjecting one molecular proportion of a tri(lower alkyl) phosphate and at least three molecular proportions of tetramethyldiamidophosphoric chloride to a temperature of from 135° to 190° C. while admixed with at least one molecular proportion of hexamethylphosphoramide.

7. A process for the manufacture of octamethylpyrophosphoramide which comprises subjecting one molecular proportion of triethylphosphate and at least three molecular proportions of tetramethyldiamidophosphoric chloride to a temperature of from 135° to 190° C. while admixed with at least one molecular proportion of hexamethylphosphoramide.

8. A process for the manufacture of octamethylpyrophosphoramide which comprises subjecting one molecular proportion of tris(tetramethyldiamidophosphoryl) phosphate to a temperature of from 135° to 190° C. while admixed with at least one molecular proportion of hexamethylphosphoramide.

9. A process for the manufacture of a pyrophosphoramide of the formula

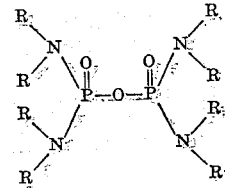

which comprises subjecting to a temperature of from 135° to 190° C. a hexaalkylphosphoramide of the formula

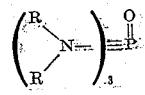

while admixed with a reagent from the group consisting of (1) a tris(tetraalkyldiamidophosphoryl) phosphate of the formula

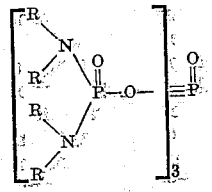

and (2) a mixture of (A) having the formula

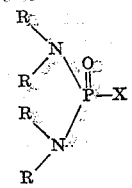

and (B) having the formula

in the molecular proportion of at least 3 moles of (A) to 1 mole of (B), X being a member of the group consisting of chlorine and R'—O—, Y being the other member of the latter group, and R and R' each representing an alkyl radical containing from 1 to 4 carbon atoms, inclusive.

HENRY TOLKMITH.

No references cited.